US008240045B2

(12) United States Patent
Sutcu et al.

(10) Patent No.: US 8,240,045 B2
(45) Date of Patent: Aug. 14, 2012

(54) GAS TURBINE TRANSITION DUCT COUPLING APPARATUS

(75) Inventors: Maz Sutcu, Oviedo, FL (US); Bradley T. Youngblood, Oviedo, FL (US)

(73) Assignee: Siemens Energy, Inc., Orlando, FL (US)

( * ) Notice: Subject to any disclaimer, the term of this patent is extended or adjusted under 35 U.S.C. 154(b) by 1701 days.

(21) Appl. No.: 11/805,057

(22) Filed: May 22, 2007

(65) Prior Publication Data

US 2010/0011576 A1 Jan. 21, 2010

(51) Int. Cl.
*B21K 25/00* (2006.01)
*F02C 7/20* (2006.01)

(52) U.S. Cl. ............ 29/889.22; 60/796; 60/799; 60/800

(58) Field of Classification Search ............... 29/889.22; 60/800, 796, 799
See application file for complete search history.

(56) References Cited

U.S. PATENT DOCUMENTS 3,455,527 A * 7/1969 Suozzo ......................... 248/550
3,609,968 A 10/1971 Mierley, Sr. et al.
3,670,497 A 6/1972 Sheldon
4,016,718 A 4/1977 Lauck
4,251,986 A * 2/1981 Thompson et al. ............. 60/797
4,297,843 A * 11/1981 Sato et al. ....................... 60/796
4,422,288 A * 12/1983 Steber ............................. 60/800
4,503,668 A 3/1985 Duncan, III et al.
4,566,851 A 1/1986 Comeau et al.
4,948,333 A 8/1990 Meer et al.
5,273,249 A * 12/1993 Peterson et al. .............. 248/550
5,333,443 A * 8/1994 Halila ............................. 60/796
5,387,082 A 2/1995 Matyscak
5,396,952 A * 3/1995 Stogner ........................ 166/78.1
5,441,385 A 8/1995 Boyd et al.
5,443,290 A * 8/1995 Boyer et al. .................... 285/95
5,494,402 A 2/1996 Glezer et al.
5,630,700 A 5/1997 Olsen et al.
5,761,898 A 6/1998 Barnes et al.
6,148,604 A * 11/2000 Salt et al. ......................... 60/797
6,442,946 B1 9/2002 Kraft et al.
6,619,915 B1 9/2003 Jorgensen
6,662,567 B1 12/2003 Jorgensen
6,895,757 B2 * 5/2005 Mitchell et al. ................. 60/772
2006/0123797 A1 * 6/2006 Zborovsky et al. ............. 60/800

* cited by examiner

*Primary Examiner* — David Bryant
*Assistant Examiner* — Jacob Cigna

(57) ABSTRACT

An apparatus is provided for coupling a first portion of a gas turbine transition duct to a second portion of a gas turbine transition duct to reduce vibratory deflection. The apparatus may comprise: at least one first support structure attached to the gas turbine transition duct first portion; at least one second support structure attached to the gas turbine transition duct second portion; and at least one coupling mechanism configured to couple the at least one first support structure to the at least one second support structure so as to allow sliding movement between the at least one first support structure and the at least one second support structure when a movement force of the at least one first support structure and the at least one second support structure exceeds a predefined frictional force threshold value.

15 Claims, 6 Drawing Sheets

GAS TURBINE TRANSITION DUCT COUPLING APPARATUS

FIELD OF THE INVENTION

The present invention relates to a method and apparatus for reducing vibration induced deflections in a gas turbine transition duct.

BACKGROUND OF THE INVENTION

A conventional combustible gas turbine engine includes a compressor, a combustor, including a plurality of combustor units, and a turbine. The compressor compresses ambient air. The combustor units combine the compressed air with a fuel and ignite the mixture creating combustion products defining a working gas. The working gases are routed to the turbine inside a plurality of transition ducts. Within the turbine are a series of rows of stationary vanes and rotating blades. The rotating blades are coupled to a shaft and disc assembly. As the working gases expand through the turbine, the working gases cause the blades, and therefore the disc assembly, to rotate.

The transition ducts are positioned adjacent the combustor units and route the working gases into the turbine. Each transition duct may comprise a panel structure and a frame coupled to an exit of the panel structure. The working gases produced by the combustor units are hot and under a pulsating pressure. The transition ducts are exposed to these high temperature gases and pulsating pressures, and vibrations can cause deflections in various locations of the duct panels and duct frames. Failure of a duct panel structure can result due to these unwanted vibration induced deflections.

U.S. Pat. No. 6,442,946 B1 to Kraft et al. discloses a system for mounting a gas turbine transition duct to a turbine inlet housing. The mounting system allows rotational movement between the transition duct and the turbine inlet housing.

SUMMARY OF THE INVENTION

In accordance with a first aspect of the present invention, a method is provided for coupling a first portion of a gas turbine transition duct to a second portion of the gas turbine transition duct to reduce vibratory deflection. The method may comprise: coupling at least one first support structure to the transition duct first portion; coupling at least one second support structure to the transition duct second portion; and coupling the at least one first support structure to the at least one second support structure such that a substantial amount of thermal expansion induced sliding movement between the at least one first support structure and the at least one second support structure is permitted while a substantial amount of vibration induced sliding movement is prevented.

Coupling the at least one first support structure to the at least one second support structure may comprise creating at least one linear sliding joint between the at least one first support structure and the at least one second support structure.

Creating at least one linear sliding joint between the at least one first support structure and the at least one second support structure may comprise applying a desired compressive force to the at least one first support structure and the at least one second support structure.

Applying a desired compressive force to the at least one first support structure and the at least one second support structure may comprise providing at least one bolt, at least one nut and at least one biasing device to compress the at least one first support structure and the at least one second support structure together at the desired compressive force.

The at least one biasing device may comprise at least one Belleville spring washer.

Creating at least one linear sliding joint between the at least one first support structure and the at least one second support structure may further comprise providing a wearing element configured to wear as the at least one first support structure moves relative to the at least one second support structure while preventing wearing of the at least one first support structure and the at least one second support structure.

The wearing element may comprise at least one washer having a wear coating on at least one side.

The desired compressive force may be within a range of about 1600 Newtons to about 3200 Newtons.

The gas turbine transition duct first portion may comprise a gas turbine transition duct panel structure and the gas turbine transition duct second portion may comprise a gas turbine transition duct frame. The at least one linear sliding joint may permit a first linear sliding movement in a first direction substantially perpendicular to a section of the duct frame to which the at least one support structure is coupled and a second, greater linear sliding movement in a second direction substantially parallel to the duct frame section.

In accordance with a second aspect of the present invention, an apparatus is provided for coupling a first portion of a gas turbine transition duct to a second portion of a gas turbine transition duct to reduce vibratory deflection. The apparatus may comprise: at least one first support structure attached to the gas turbine transition duct first portion; at least one second support structure attached to the gas turbine transition duct second portion; and at least one coupling mechanism. configured to couple the at least one first support structure to the at least one second support structure so as to allow sliding movement between the at least one first support structure and the at least one second support structure when a movement force of at least one of the at least one first support structure and the at least one second support structure exceeds a predefined frictional force threshold value.

The at least one coupling mechanism may comprise at least one attaching device associated with the at least one first support structure and the at least one second support structure for applying a compressive force to the at least one first support structure and the at least one second support structure.

The at least one coupling mechanism may further comprise at least one biasing device associated with the at least one attaching device, the at least one first support structure, and the at least one second support structure configured to apply, with the attaching device, a desired compressive force to the at least one first support structure and the at least one second support structure.

The at least one attaching device may comprise at least one bolt and at least one nut.

The at least one biasing device may comprise at least one Belleville spring washer.

The at least one first support structure may comprise a support post fixedly coupled to the first portion of the gas turbine transition duct. The at least one second support structure may comprise a support tab fixedly coupled to a second portion of the gas turbine transition duct. The support post may have a substantially planar distal end provided with an oversized bore and the support tab may have a substantially planar distal end provided with an oversized bore. The distal end of the support post may be substantially parallel to and positioned adjacent to the distal end of the support tab.

The at least one bolt may comprise a first bolt extending through the bores in the distal ends of the support post and support tab and a bore in at least one Belleville spring washer. The at least one nut may comprise a first nut coupled to the first bolt.

The gas turbine transition duct first portion may comprise a gas turbine transition duct panel structure and the gas turbine transition duct second portion may comprise a gas turbine transition duct frame.

The oversized bore in the distal end of the support tab may be oversized at least in a direction substantially parallel to a section of the transition duct frame to which the support tab is coupled such that the coupling mechanism permits a first linear sliding movement in a first direction substantially perpendicular to the section of the duct frame to which the support tab is coupled and a second substantially greater linear sliding movement in a second direction substantially parallel to the duct frame section.

The predefined frictional force threshold value may fall within a range of from about 240 Newtons to about 1200 Newtons.

The at least one coupling mechanism may allow linear sliding movement between the at least one first support structure and the at least one second support structure when a movement force of at least one of the at least one first support structure and the at least one second support structure exceeds a predefined frictional force threshold value.

DETAILED DESCRIPTION OF THE INVENTION

In the following detailed description of the preferred embodiment, reference is made to the accompanying drawings that form a part hereof, and which is shown by way of illustration, and not by way of limitation, a specific preferred embodiment in which the invention may be utilized and that changes may be made without departing from the spirit and scope of the present invention.

Referring now to FIGS. 1-4, an apparatus 10, constructed in accordance with the present invention, is illustrated for coupling a first portion of a gas turbine transition duct 20 to a second portion of the gas turbine transition duct 20.

A conventional combustible gas turbine engine (not shown) includes a compressor (not shown), a combustor (not shown), including a plurality of combustor units (not shown), and a turbine (not shown). The compressor compresses ambient air. The combustor units combine the compressed air with a fuel and ignite the mixture creating combustion products defining a working gas. The working gases are routed from the combustor units to the turbine inside a plurality of transition ducts 20, see FIGS. 2 and 4. The working gases expand in the turbine and cause blades coupled to a shaft and disc assembly to rotate.

Figure 4:
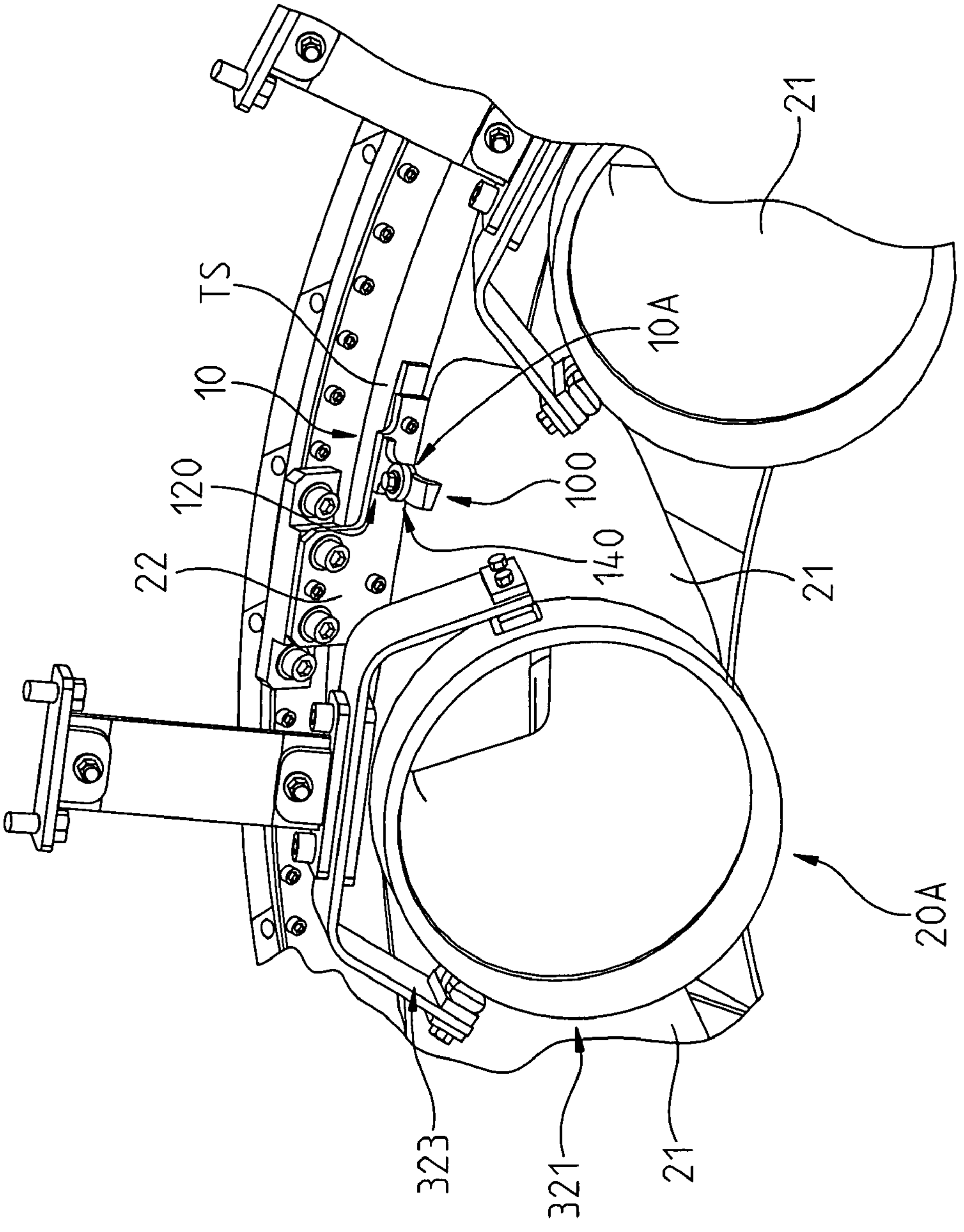
FIG. 4 is perspective view of one and portions of two other gas turbine transition ducts including the coupling apparatus of the present invention, where the ducts are connected to a section of a turbine inlet structure.

The plurality of transition ducts 20 provided in the engine may be constructed in the same manner, see FIG. 4. Each transition duct 20 may include at least one corresponding coupling apparatus 10. Hence, only a single transition duct 20A and a corresponding coupling apparatus 10A will be discussed in detail herein.

Figure 2:
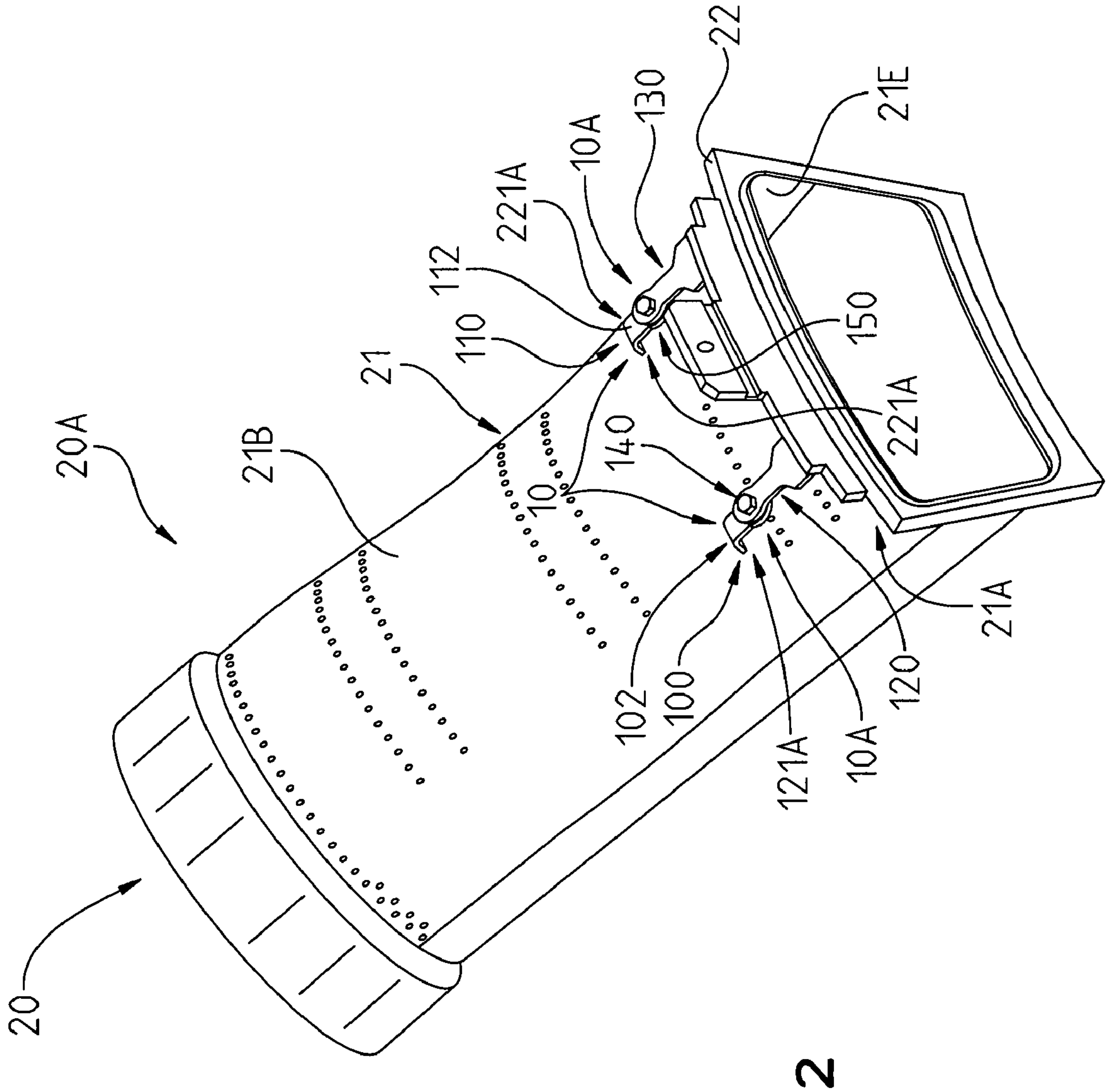
FIG. 2 is a perspective view of a gas turbine transition duct including the coupling apparatus of the present invention.
Figure 3:
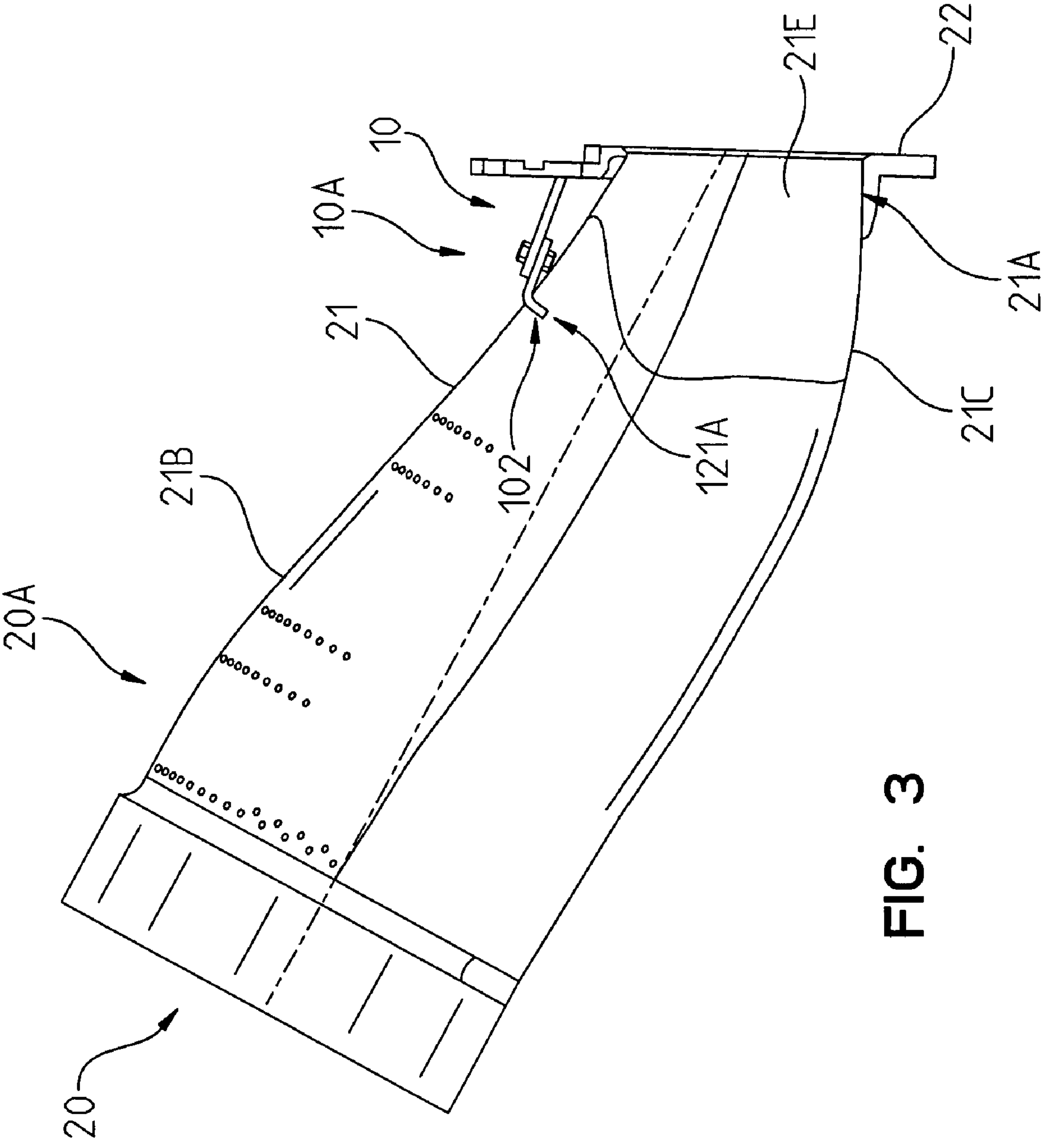
FIG. 3 is a side elevational view of the gas turbine transition duct and coupling apparatus illustrated in FIG. 2.
Figure 5:
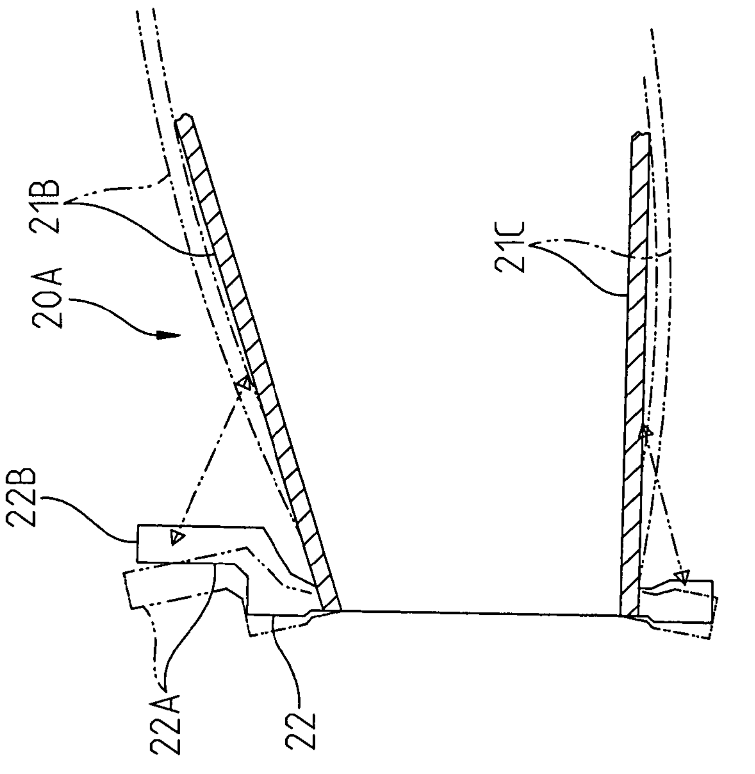
FIG. 5 is a cross sectional side schematic partial view of the exit end of a gas turbine transition duct without the coupling apparatus of the present invention showing exaggerated vibratory deflections in the duct panel structure and duct frame.

The transition duct 20A may comprise a substantially tubular duct panel structure 21 and a frame 22 coupled at an exit or aft-end 21A of the duct panel structure 21 via welds, see FIGS. 2 and 3. The duct panel structure 21 may be formed from Inco 617 sheet material and have a thickness of from about 4.7 mm to about 6.0 mm. The frame 22 may be formed from Inco 617 plate material and have a thickness of from about 28 mm to about 32 mm. The working gases produced by a corresponding combustor unit are hot and under a pulsating pressure. The transition duct 20A is exposed to these high temperature working gases and pulsating pressures. The pulsating pressures may cause vibrations in the panel structure 21. In the absence of the coupling apparatus 10 of the present invention, these vibrations can cause deflections in the duct panel structure 21, see FIG. 5, where top and bottom panels 21B and 21C of the panel structure 21 are shown in solid line in a non-deflected state and in phantom line in a deflected state. The vibrations in the panel structure 21, without the coupling apparatus 10, can also cause vibrations in and deflection of the duct frame 22, see FIG. 5. Failure of the duct panel structure 21 and/or duct frame 22, e.g., failure at a location where the duct panel structure 21 is coupled to the frame 22, may occur as a result of these vibration induced deflections.

The duct frame 22 is coupled such as by bolts to a turbine inlet structure TS, see FIG. 4. A forward end 321 of the duct panel structure 21 is coupled by bracket structure 323 to a compressor exit casing (not shown in FIG. 4).

When the gas turbine engine is started from an ambient temperature condition, the transition duct 20 rapidly increases from ambient temperature to a much higher operating temperature. In the illustrated embodiment, upon engine start-up from the ambient temperature condition, it may take approximately 10 minutes for the duct panel structure 21 to fully reach an operating temperature. The corresponding thicker duct frame 22, located farther away from its corresponding combustor unit, may take approximately 30 minutes to fully reach an operating temperature.

When the engine is shut down from an operating steady state temperature condition, the transition duct 20 will return to ambient temperature. In the illustrated embodiment, during this cool-down period, the duct panel structure 21 will cool at a different rate than its corresponding thicker duct frame 22.

Figure 6:
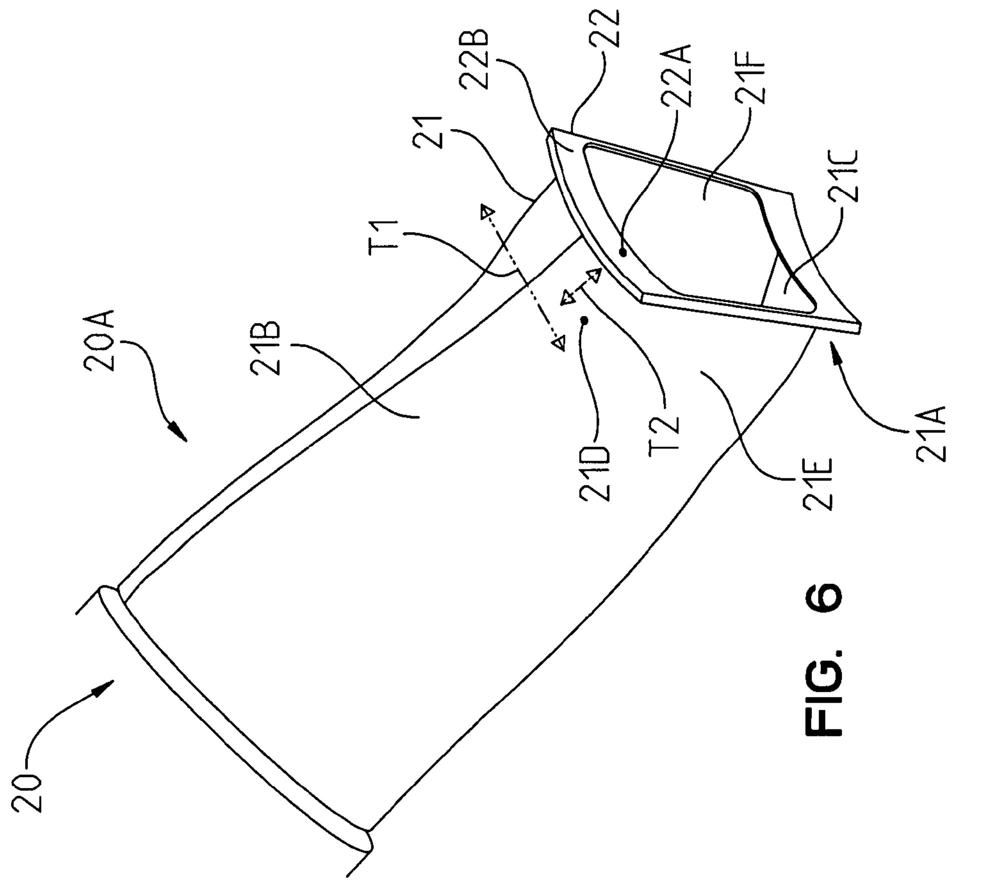
FIG. 6 is a perspective view of the gas turbine transition duct with the coupling apparatus of the present invention removed showing thermal expansion induced relative movement between the duct panel structure and the duct frame.

Because the duct panel structure 21 reaches its operating temperature more quickly than its corresponding duct frame 22 during engine start up and cools down to ambient temperature more quickly than the duct frame 22 after the engine has been shut down, the duct panel structure 21 thermally expands/contracts at a higher rate than the duct frame 22 during engine start up and cool down. The differences in the rates of thermal expansion/contraction of the duct panel structure 21 and its corresponding duct frame 22 during engine start up and shut down produces, for example, a first relative movement between a point 21D on the top panel 21B of the duct panel structure 21 and a point 22A on the duct frame 22 equal to the difference between the expansions/contractions of the duct panel structure 21 and the duct frame 22 as the panel structure 21 and duct frame 22 heat and cool, see FIG. 6. This first relative movement between points 21D and 22A may occur substantially in a direction parallel to a section 22B of the duct frame 22, where the direction is designated by arrow $T_1$ in FIG. 6. Some movement may also occur in a direction transverse to the section 22B, designated by arrow $T_2$ in. FIG. 6, such that the points 21D and 22A move toward and away from one another.

In accordance with the present invention, the coupling apparatus 10A is provided to minimize or eliminate vibration induced deflections of the top panel 21B of the duct panel structure 21 yet allow at least some thermal expansion induced movement between the top panel 21B and the duct frame 22 so as to prevent thermal cycle failure at one or more locations where the coupling apparatus 10A is coupled to the top panel 21B and the duct frame 22. While the coupling apparatus 10A minimizes or eliminates vibration induced deflections of the top panel 21B, high cycle vibrations in the top panel 21B, resulting from the pulsating pressures of the high temperature working gases passing through the duct panel structure 21, remain. However, as will be discussed below, most or a substantial amount of movement between the duct top panel 21B and the duct frame 22 caused by these vibrations is prevented. One or more further coupling apparatuses, not shown, constructed in the same manner as the coupling apparatus 10A coupled to panel 21B, may be provided and coupled between the bottom panel 21C of the panel structure 21 and the duct frame 22, a first side panel 21E of the panel structure 21 and the duct frame 22 and a second side panel 21F of the panel structure 21 and the duct frame 22.

In the illustrated embodiment, the coupling apparatus 10A comprises first and second support structures 100 and 110 coupled to the top panel 21B of the panel structure 21, third and fourth support structures 120 and 130 coupled to the duct frame 22 and first and second coupling mechanisms 140 and 150 for compressively. coupling the first and third support structures 100 and 120 together and the second and fourth support structures 110 and 130 together, see FIG. 2. The first support structure 100 comprises a first L-shaped support post 102 coupled to a first section 121A of the top panel 21B of the panel structure 21, see FIGS. 1-3. The, second support structure 110 comprises a second L-shaped support post 112 coupled to a second section 221A of the top panel 21B. The sections 121A and 221A are spaced away from the duct frame 22 by a distance D, see FIGS. 1 and 1C. The sections 121A and 221A are selected such that the first and second support posts 102 and 112 are attached to the top panel 21B at or near locations on the top panel 21B where maximum vibration induced deflection takes place, when a coupling apparatus is not provided, but away from the portions of the panel 21B which heat to the highest temperature during steady state operation of the engine so as to avoid thermal cycle failure at those locations. Hence, the sections 121A and 221A may not be located at the panel locations that experience maximum vibration induced deflection when a coupling apparatus is not provided since those panel locations may heat to the highest temperature during steady state operation of the engine. The first and second support posts 102 and 112 are coupled at proximal ends 102A and 112A to the top panel 21B via welds in the illustrated embodiment, see FIGS. 1, 1A, 1C, 2 and 3. Each of the first and second support posts 102 and 112 further includes a generally planar distal end 102B and 112B having an oversized bore 202B and 204B, see FIGS. 1, 1A and 1C.

Figures 1, 1A:
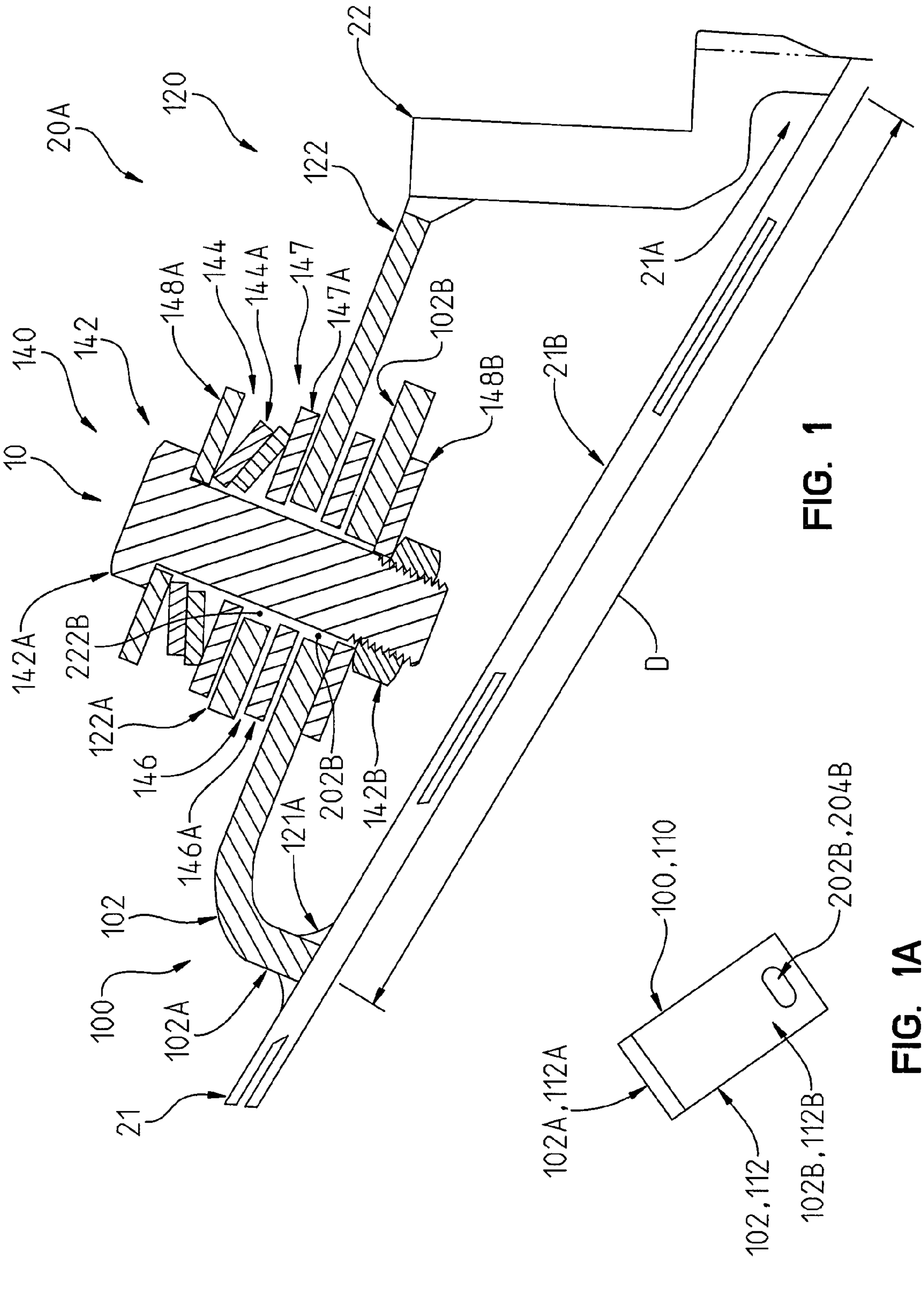
FIG. 1 is a cross sectional side view of a first coupling mechanism for coupling first and third support structures together.
FIG. 1A is a top view of an L-shaped support post.
Figure 1C:
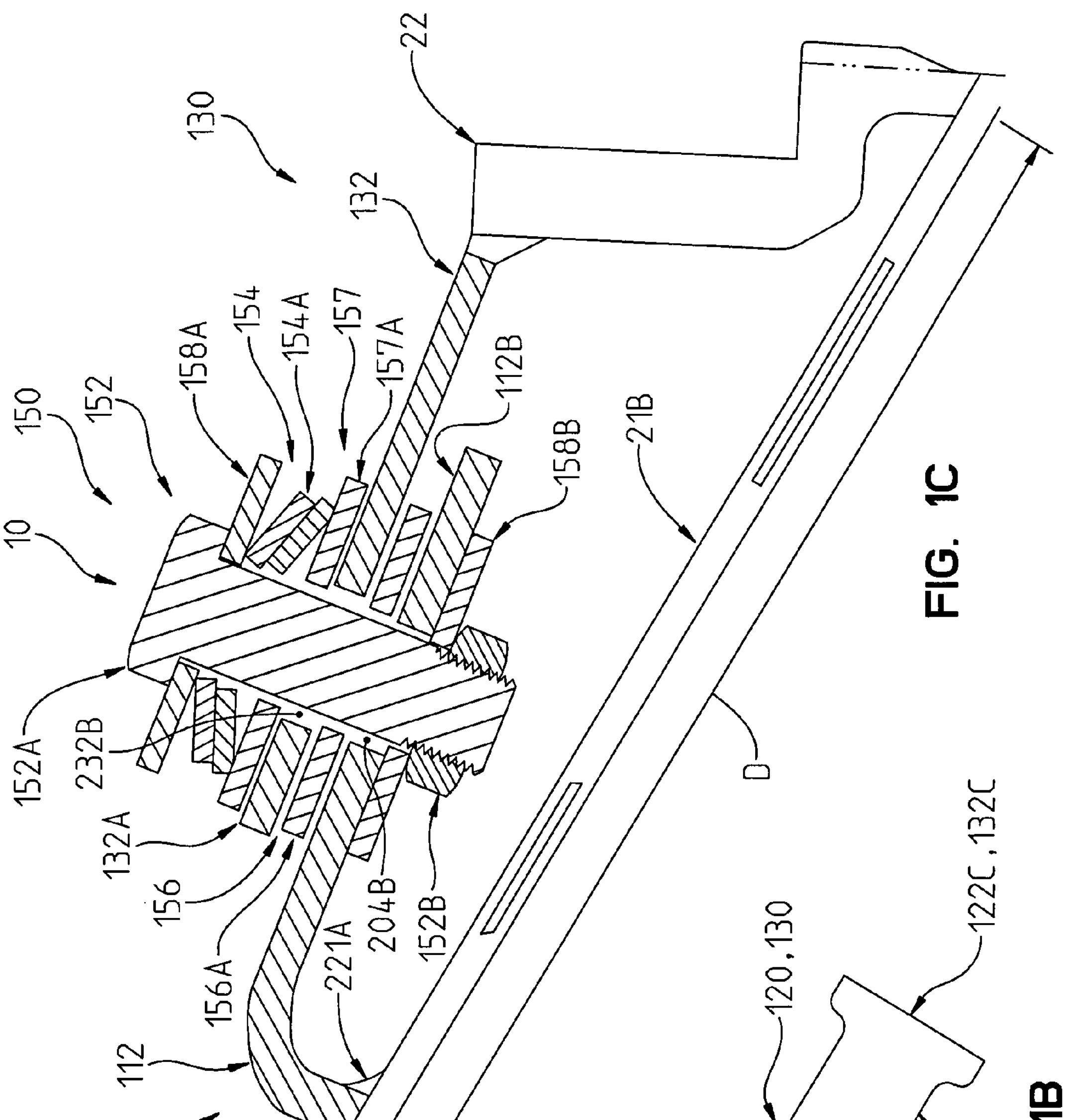
FIG. 1C is a cross sectional side view of a second coupling mechanism for coupling second and fourth support structures together.
Figure 1B:
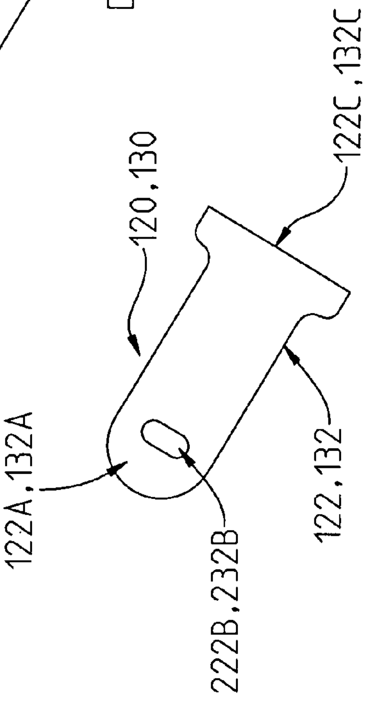
FIG. 1B is a top view of a tab.

The third support structure 120 comprises a generally planar first support tab 122 having a distal end 122A provided with a generally oversized bore 222B, see FIGS. 1 and 1B. The fourth support structure 130 comprises a generally planar. support tab 132 having a distal end 132A provided with a generally oversized bore 232B, see FIGS. 1B and 1C. The first and second tabs 122 and 132 are fixedly coupled at proximal ends 122C and 132C to the duct frame 22 via welds.

The first coupling mechanism 140 comprises a first attaching device 142 and a first biasing device 144. The first attaching device 142 comprises a first bolt 142A and a first nut 142B. The first biasing device 144 comprises one or more Belleville spring washers 144A. In the illustrated embodiment, two Belleville spring washers 144A made of Inconel 718 are provided. However less than two or more than two Belleville spring washers 144A may be provided. Further, the Belleville washers 144A may be made of materials different from Inconel 718. Also, devices, other than Belleville spring washers, such as helicoil springs, may be used instead as a biasing device.

The first coupling mechanism 140 further comprises first and second wearing elements 146 and 147, which in the illustrated embodiment, comprise first and second washers 146A and 147A provided with wear resistant coatings, see FIG. 1. The first coupling mechanism 140 also comprises first and second flat washers 148A and 148B.

The first bolt 142A has a diameter smaller than the size of the oversized bores 202B and 222B provided in the distal ends 102B and 122A of the first support post 102 and the first support tab 122. The bolt 142A passes through the oversized bores 202B and 222B, the Belleville spring washers 144A, the washers 146A and 147A and the first and second washers 148A-148B. The first nut 142B is coupled to the first bolt 142A such that the first coupling mechanism 140 applies a desired compressive force to the distal end 102B of the first support post 102 and the distal end 122A of the first support tab 122. As will be discussed in further detail below, the desired compressive force is selected so as to allow the distal end 102B of the first support post 102 and the distal end 122A of the first support tab 122 to frictionally slide relative to one another in response to thermal expansion differences between the top panel 21B and the frame 22 during engine start up and shut down.

In response to an increasing compressive force, the Belleville spring washers 144A will compress further from an initial relaxed state. Accordingly, a desired compressive force may be applied to the distal end 102B of the first support post 102 and the distal end 122A of the first support tab 122 by tightening the nut 142B on the bolt 142A to a torque corresponding to the desired compressive force.

The first and second washers 146A and 147A define sacrificial wearing elements to prevent the wearing of the distal end 102B of the first support post 102 and the distal end 122A of the first support tab 122 as they frictionally slide relative to one another during engine start up and shut down. The first and second washers 146A and 147A may be made from 1.5 Cr-0.5 Mo-1 Al alloy steel and the wear coatings may be formed via nitriding.

The second coupling mechanism 150 comprises a second attaching device 152 and a second biasing device 154, see FIG. 1C. The second attaching device 152 comprises a second bolt 152A and a second nut 152B. The second biasing device

154 comprises one or more Belleville spring washers 154A, two in the illustrated embodiment, which may be formed from the same material as the Belleville spring washers 144A. The second coupling mechanism 150 further comprises third and fourth wearing elements 156 and 157, which in the illustrated embodiment, comprise third and fourth washers 156A and 157A provided with wear resistant coatings. The second coupling mechanism 150 also comprises third and fourth flat washers 158A and 158B.

The second bolt 152A has a diameter smaller than the size of the oversized bores 204B and 232B provided in the distal ends 112B and 132A of the second support post 112 and the second support tab 132. The bolt 152A passes through the oversized bores 204B and 232B, the Belleville spring washers 154A, the washers 156A and 157A and the third and fourth washers 158A-158B. The second nut 152B is coupled to the second bolt 152A such that the second coupling mechanism 150 applies a desired compressive force to the distal end 112B of the second support post 112 and the distal end 132A of the second support tab 132. As will be discussed in further detail below, the desired compressive force is selected so as to allow the distal end 112B of the second support post 112 and the distal end 132A of the second support tab 132 to frictionally slide relative to one another in response to thermal expansion differences between the top panel 21B and the frame 22 during engine start up and shut down. A desired compressive force may be applied to the distal end 112B of the second support post 112 and the distal end 132A of the second support tab 132 by tightening the nut 152B on the bolt 152A to a torque corresponding to the desired compressive force.

The third and fourth washers 156A and 157A define sacrificial wearing elements to prevent the wearing of the distal end 112B of the second support post 112 and the distal end 132A of the second support tab 132 as they frictionally slide relative to one another during engine start up and shut down. The washers 156A and 157A may be made from 1.5 Cr-0.5 Mo-1 Al alloy steel and the wear coatings may be formed via nitriding.

As noted above, the coupling apparatus 10A minimizes or eliminates vibration induced deflections or large relative movements between the top panel 21B of the duct panel structure 21 and the duct frame 22; however, high cycle vibrations in the transition duct 20A, resulting from the pulsating pressures of the high temperature working gases passing through the transition duct 20A, remain and cause: the transition duct 20A as a whole to vibrate. This vibratory movement, however, does not cause large relative movements between the top panel 21B and the duct frame 22 due to the presence of the coupling apparatus 10A. It is believed that these vibrations create a vibration induced movement force in one or both of the distal end 102B of the first support post 102 and the distal end 122A of the first support tab 122. The vibration induced movement forces are three dimensional in nature and have components in a plane parallel to the plane of the interface between the distal ends 102B and 122A. For example, one component may extend in a direction substantially parallel to the duct frame section 22B. Likewise, it is believed that the high cycle vibrations in the transition duct 20A further create a vibration induced movement force in one or both of the distal end 112B of the second support post 112 and the distal end 132A of the second support tab 132. The vibration induced movement forces are three dimensional in nature and have components in a plane parallel to the plane of the interface between the distal ends 112B and 132A. For example, a component may extend in a direction substantially parallel to the duct frame section 22B. In the illustrated embodiment, the maximum vibration induced movement force transmitted by either the distal end 102B of the first support post 102 or the distal end 122A of the first support tab 122 may be 240 N, which may be determined by finite element vibrational analysis. Likewise, the maximum vibration induced movement force transmitted by either the distal end 112B of the second support post 112 or the distal end 132A of the second support tab 132 may be 240 N, which may be determined by finite element vibrational analysis.

As also noted above, the differences in the rates of thermal expansion/contraction of the duct panel structure 21 and its corresponding duct frame 22 during engine start up and shut down produce relative movement between the point 21D on the top panel 21B of the duct panel structure 21 and the point 22A on the duct frame 22. Hence, during engine start up and shut down, it is believed that thermally induced movement forces are created by the distal end 102B of the first support post 102 and/or the distal end 122A of the first support tab 122 in one or more planes parallel to the plane of the interface between them. Likewise, it is believed that thermally induced movement forces are created by the distal end 112B of the second support post 112 and/or the distal end 132A of the second support tab 132 in one or more planes parallel to the interface between them. In the illustrated embodiment, the maximum thermally induced movement forces created by the distal end 102B of the first support post 102 or by the distal end 122A of the first support tab 122 will be substantially greater than 240 N, for example, greater than about 5,000 N. Likewise, the maximum thermally induced movement force created by the distal end 112B of the second support post 112 or by the distal end 132A of the second support tab 132 will be substantially greater than 240 N, for example, greater than about 5,000.

The desired compressive force applied by the first coupling mechanism 140 to the distal end 102B of the first support post 102 and the distal end 122A of the first support tab 122 is selected so as to prevent vibration induced relative movement between the distal end 102B of the first support post 102 and the distal end 122A of the first support tab 122, yet allow the distal end 102B of the first support post 102 and the distal end 122A of the first support tab 122 to frictionally slide relative to one another at the interface between them in response to thermal expansion differences between the top panel 21B and the frame 22 during engine start up and shut down. Likewise, the desired compressive force applied by the second coupling mechanism 150 to the distal end 112B of the second support post 112 and the distal end 132A of the second support tab 132 is selected so as to prevent vibration induced relative movement between the distal end 112B of the second support post 112 and the distal end 132A of the second support tab 132, yet allow the distal end 112B of the second support post 112 and the distal end 132A of the second support tab 132 to frictionally slide relative to one another at the interface between them in response to thermal expansion differences between the top panel 21B and the frame 22 during engine start up and shut down.

Hence, in the illustrated embodiment, it is believed that the desired compressive force applied by the first coupling mechanism 140 to the distal end 102B of the first support post 102 and the distal end 122A of the first support tab 122 should be selected so that a frictional force applied by the distal end 102B of the first support post 102 to the distal end 122A of the first support tab 122 and vice versa is between about 240 N and about 1200 N and preferably between about 480 N and 960 N so as to prevent the vibration induced movement of the distal end 102B of the first support post 102 relative to the distal end 122A of the first support tab 122, yet allow the distal end 102B of the first support post 102 and the distal end

122A of the first support tab 122 to frictionally slide relative to one another in response to thermal expansion differences between the top panel 21B and the frame 22 during engine start up and shut down. Likewise, in the illustrated embodiment, it is believed that the desired compressive force applied by the second coupling mechanism 150 to the distal end 112B of the second support post 112 and the distal end 132A of the second support tab 132 should be selected so that a frictional force applied by the distal end 112B of the second support post 112 to the distal end 132A of the second support tab 132 and vice versa is between about 240 N and about 1200 N and preferably between about 480 N and 960 N so as to prevent the vibration induced movement of the distal end 112B of the second support post 112 relative to the distal end 132A of the second support tab 132, yet allow the distal end 112B of the second support post 112 and the distal end 132A of the second support tab 132 to frictionally slide relative to one another in response to thermal expansion differences between the top panel 21B and the frame 22 during engine start up and shut down.

As is well known to those skilled in the art, the compressive force necessary to prevent sliding movement between two surfaces, called a normal force, may be determined by the equation:

Normal Force=Frictional Force/Coefficient of Friction.

As noted above with regard to the illustrated embodiment, the maximum vibration induced movement force created by either the distal end 102B of the first support post 102 or the distal end 122A of the first support tab 122 may be 240 N. Likewise in the illustrated embodiment, the maximum vibration induced movement force created by either the distal end 112B of the second support post 112 or the distal end 132A of the second support tab 132 may be 240 N. In the illustrated embodiment, the desired compressive force applied by the first coupling mechanism 140 is determined using the above equation and setting the value for "Frictional Force" equal to at least 240 N, which corresponds to a frictional force required to oppose the maximum vibration induced movement force created by either the distal end 102B of the first support post 102 or the distal end 122A of the first support tab 122 so as to prevent vibration induced movement of the distal ends 102B and 122A. It is contemplated that the "Frictional Force" value in the above equation may be set to a value greater than 240 N, such as 480 N, so as to include a design safety margin. The "Frictional Force" value of either 240 N or 480 N also corresponds to a threshold frictional force value. Hence, the distal end 102B of the first support post 102 and the distal end 122A of the first support tab 122 are permitted to move relative to one another when the thermally induced movement forces created by the distal end 102B of the first support post 102 and/or the distal end 122A of the first support tab 122 exceed the threshold frictional force value, which may occur during engine start up or shut down. In the illustrated embodiment, the value for the "Coefficient of Friction" used in the above equation was set equal to 0.3.

Further, the desired compressive force applied by the second coupling mechanism 150 is determined using the above equation and setting the value for "Frictional Force" equal to at least 240 N, which corresponds to a frictional force required to oppose the maximum vibration induced movement force created by either the distal end 112B of the second support post 112 or the distal end 132A of the second support tab 132 so as to prevent vibration induced movement of the distal ends 112B and 132A. It is contemplated that the "Frictional Force" value in the above equation may be set to a value greater than 240 N, such as 480 N, so as to include a design safety margin. The "Frictional Force" value of either 240 N or 480 N also corresponds to a threshold frictional force value. Hence, the distal end 112B of the second support post 112 and the distal end 132A of the second support tab 132 are permitted to move relative to one another when the thermally induced movement forces created by the distal end 112B of the second support post 112 and/or the distal end 132A of the second support tab 132 exceed the threshold frictional force value, which may occur during engine start up or shut down. In the illustrated embodiment, the value for the "Coefficient of Friction" was set equal to 0.3.

It is currently believed that the desired compressive force to be applied by the first coupling mechanism 140 to the distal end 102B of the first support post 102 and the distal end 122A of the first support tab 122 and by the second coupling mechanism 150 to the distal end 112B of the second support post 112 and the distal end 132A of the second support tab 132 should be between about 800 Newtons and about 4000 Newtons and preferably between about 1600 Newtons and about 3200 Newtons. Such a compressive force will prevent the vibration induced movement between the distal end 102B of the first support post 102 and the distal end 122A of the first support tab 122, yet allow the distal end 102B of the first support post 102 and the distal end 122A of the first support tab 122 to frictionally slide relative to one another in response to thermal expansion differences between the top panel 21B and the frame 22 during engine start up and shut down. Likewise, such a compressive force will prevent vibration induced movement between the distal end 112B of the second support post 112 and the distal end 132A of the second support tab 132, yet allow the distal end 112B of the second support post 112 and the distal end 132A of the second support tab 132 to frictionally slide relative to one another in response to thermal expansion differences between the top panel 21B and the frame 22 during engine start up and shut down.

While a particular embodiment of the present invention has been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A method of coupling a first portion of a gas turbine transition duct to a second portion of a gas turbine transition duct to reduce vibratory deflection comprising:

coupling at least one first support structure to said gas turbine transition duct first portion;

coupling at least one second support structure to said gas turbine transition duct second portion;

and coupling said at least one first support structure to said at least one second support structure by creating at least one sliding joint between said at least one first support structure and said at least one second support structure such that a substantial amount of thermal expansion induced sliding movement is permitted between said at least one first support structure and said at least one second support structure while a substantial amount of vibration induced sliding movement is prevented, wherein said at least one sliding joint permits a first linear sliding movement in a first direction substantially perpendicular to a section of said gas turbine transition duct second portion to which said at least one second support structure is coupled and a second greater linear sliding movement in a second direction substantially parallel to said section of said gas turbine transition duct second portion, said second direction being substantially perpendicular to a longitudinal axis of said one second support structure.

2. The method of claim 1, wherein said gas turbine transition duct first portion comprises a gas turbine transition duct panel structure, said gas turbine transition duct second portion comprises a gas turbine transition duct frame.

3. The method of claim 1, wherein said creating at least one sliding joint between said at least one first support structure and said at least one second support structure comprises applying a desired compressive force to said at least one first support structure and said at least one second support structure.

4. The method of claim 3, wherein said desired compressive force is within a range of about 1600 Newtons to about 2400 Newtons.

5. The method of claim 3, wherein said creating at least one sliding joint between said at least one first support structure and said at least one second support structure further comprises providing a wearing element configured to wear as said at least one first support structure moves relative to said at least one second support structure while preventing wearing of said at least one first support structure and said at least one second support structure.

6. The method claim 5, wherein said wearing element comprises at least one washer having a wear coating on at least one side.

7. The method of claim 3, wherein said applying a desired compressive force to said at least one first support structure and said at least one second support structure comprises providing at least one bolt, at least one nut and at least one biasing device to compress said at least one first support structure and said at least one second support structure together at said desired compressive force.

8. The method of claim 7, wherein said biasing device is at least one Belleville spring washer.

9. The method of claim of claim 7, wherein said one first support structure comprises a first oversized bore and said one second support structure comprises a second oversized bore, said one bolt passing through said first and second oversized bores.

10. The method of claim 7, wherein said creating at least one sliding joint between said at least one first support structure and said at least one second support structure further comprises providing at least one wearing element between said at least one biasing element and said at least one bolt.

11. The method of claim 10, wherein said creating at least one sliding joint between said at least one first support structure and said at least one second support structure further comprises providing at least one wearing element between said at least one first support structure and said at least one nut.

12. A method of coupling a first portion of a gas turbine transition duct to a second portion of a gas turbine transition duct to reduce vibratory deflection comprising:

coupling a first support structure having a first oversized bore to said gas turbine transition duct first portion; coupling a second support structure having a second oversized bore to said gas turbine transition duct second portion; and coupling said first support structure to said second support structure by creating a sliding joint between said first support structure and said second support structure such that a substantial amount of thermal expansion induced sliding movement is permitted between said first support structure and said second support structure while a substantial amount of vibration induced sliding movement is prevented, wherein said creating a sliding joint between said first support structure and said second support structure comprises providing a bolt passing through said first and second oversized bores, a nut and at least one biasing device to compress said first support structure and said second support structure together at a desired compressive force; wherein said first and second oversized bores are oversized with respect to said bolt.

13. The method of claim 12, wherein said first oversized bore has it longest dimension extending in a direction substantially perpendicular to a longitudinal axis of said first support structure and said second oversized bore has it longest dimension extending in a direction substantially perpendicular to a longitudinal axis of said second support structure.

14. The method of claim 12, wherein said creating a sliding joint between said first support structure and said second support structure further comprises providing a wearing element between said at least one biasing element and said bolt.

15. The method of claim 14, wherein said creating a sliding joint between said first support structure and said second support structure further comprises providing at least one wearing element between said first support structure and said nut.

* * * * *